United States Patent [19]

Howard, Jr. et al.

[11] Patent Number: 4,756,824
[45] Date of Patent: Jul. 12, 1988

[54] LIQUID FILTER WITH CHIP DETECTOR ASSEMBLY

[75] Inventors: Paul L. Howard, Jr., West Chester; James L. Horan, Sharon Hill, both of Pa.

[73] Assignee: Aeroquip Corporation, Jackson, Mich.

[21] Appl. No.: 876,088

[22] Filed: Jun. 19, 1986

[51] Int. Cl.$^4$ .................. B03C 1/30; B01D 35/06
[52] U.S. Cl. .................................. 210/85; 210/130; 210/223; 210/695
[58] Field of Search ............... 210/85, 222, 223, 695, 210/130; 123/196 A; 335/305; 209/38, 223.1

[56] References Cited

U.S. PATENT DOCUMENTS

| | | | |
|---|---|---|---|
| 3,186,549 | 6/1965 | Botstiber | 210/222 X |
| 3,317,042 | 5/1967 | Botstiber | 210/223 X |
| 3,325,009 | 6/1967 | Botstiber et al. | 210/223 X |

Primary Examiner—Richard V. Fisher
Assistant Examiner—W. Gary Jones
Attorney, Agent, or Firm—Lipton & Famiglio

[57] ABSTRACT

An arrangement of a standardized filter element for placing into a housing which is provided with an automatic bypass and with a pop-up botton type by-pass differential pressure indicator, selectively, and a set of at least two annular magnets positioned so as to form at the liquid flow entrance a chip arresting and detention gap among them and along their own peripheries and followed by the action along that of the filter element. One of the filter element sleeves and the grounded housing are utilized as conductors for the chip retention gap, leading to an electric connector for external wiring to a power source and indicating means.

4 Claims, 1 Drawing Sheet

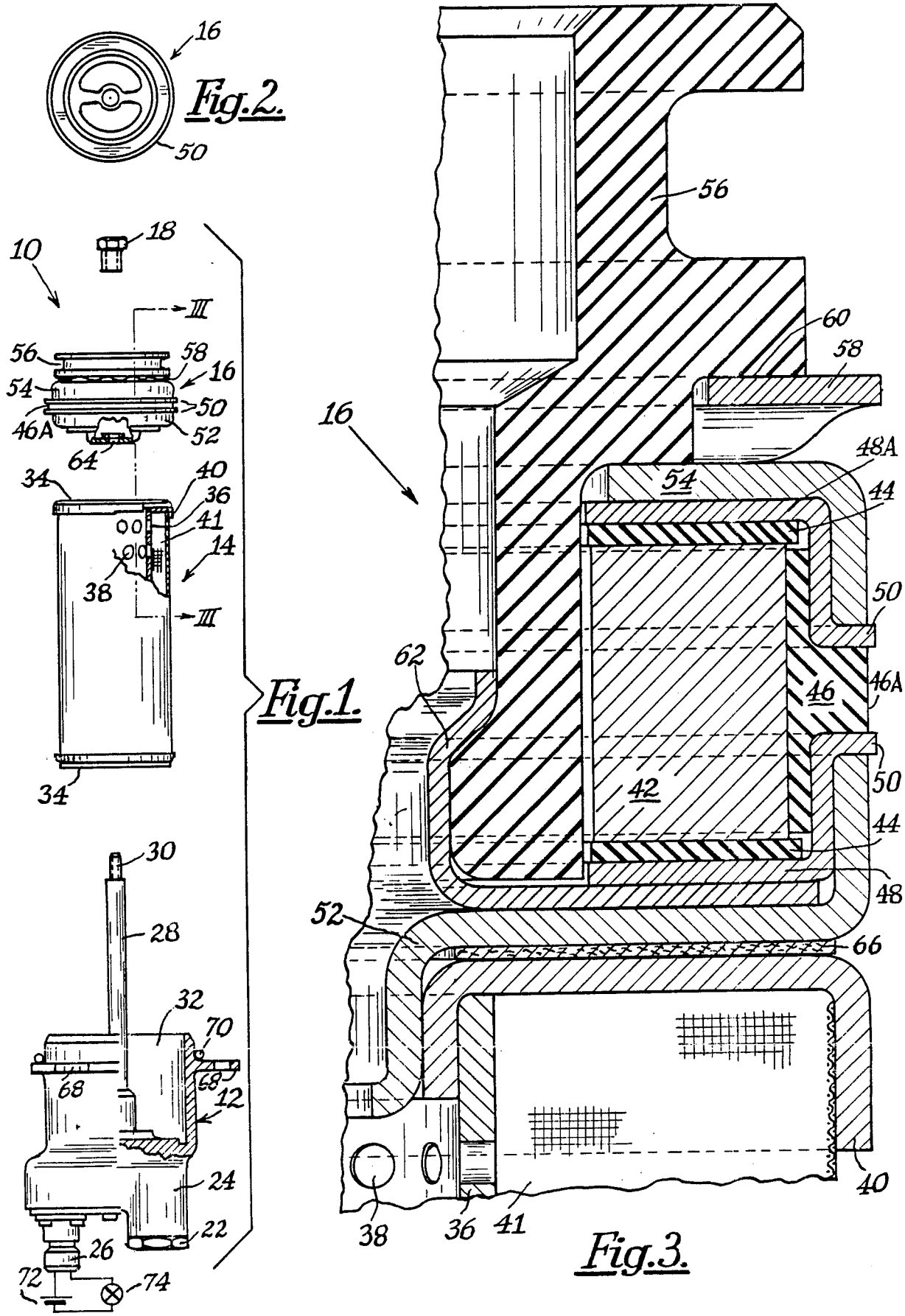

LIQUID FILTER WITH CHIP DETECTOR ASSEMBLY

BACKGROUND

Several individual filters as well as several individual chip detectors for use in hydraulic systems, especially in those carrying engine lubricating oils are known in this art. Whereas each of those respective units performs its function commensurate with its specifications, it requires one unit of each kind to effect a concurrent chip detection and filtering operation. This obvious disadvantage results further in the following undesirable characteristics:

(a) Two basic installation procedures are required instead of only one for the combined unit;

(b) Two generic component parts have to be inventoried instead of one;

Contrariwise, units are known which contain both a chip detector and a filter element within one envelope, thereby reducing the parts inventory and both the installation and removal operations, and precluding a failure of installing, or replacing, one of the two required elements.

Devices of the foregoing variety, although performing adequately within their parameters, present, however, the following disadvantages over the subject improvement:

(a) The chip detecting means are usually inside of the filtering means or in another close physical and operational affinity with the latter resulting in possible ill-effects to each other should one of the two elements be filled to capacity with foreign particles, or fail for another reason.

(b) The restoring of the device after a failure requires the negotiation of both the filter and the chip detector, even though only one of the two component parts may have suffered damage.

Teachings of prior art exhibiting one or more of respective aforementioned characteristics include, but may not be limited to, the following, believed to be typical examples:

| Botstiber | 3,186,549 | June 1, 1965 |
| Botstiber | 3,317,042 | May 2, 1967 |
| Botstiber, et al. | 3,325,009 | June 13, 1967 |

Each of the referenced art allows for the entering of, in those cases, a lubricant into both a chamber formed by each said unit and, not necessarily in this order, the space enveloped by a filtering screen inside of which the chip-detector unit is positioned. This arrangement requires the complete, often cumbersome, disassembly of each entire device for the inspection, servicing and replacement of component parts. It does not allow for ready access to either or both these parts, causing possible premature, unnecessary servicing and operational outages.

SUMMARY OF INVENTION

The subject invention relates to the joint operation among a chip detector and a standard filter element within one envelope. The advantages of this design approach include the ability of automatically providing chip detection in a full-flow configuration within a standardized filter housing environment. This obviates the need for additional hardware to be mounted on the customer's/user's engine to provide this joint function. Further, the now built-in ability to collect ferromagnetic debris reduces the tendency of the filter to clog in operation or between scheduled inspection intervals.

The invention further includes the following features as shown and described herein:

(a) A standard filter element for placing into a housing which includes an automatic by-pass and/or pop button type by-pass indication;

(b) A concentrically arranged set of at least two axially spaced annular, permanent and preferably ceramic magnets forming a lateral chip retention gap along their peripheries which equal the periphery dimension of the filter assembly at its oil-flow entrance end;

(c) A means utilizing the metallic filter element sleeve as one conductor and the outer housing as another conductor to establish an electric circuit from the chip retention and detection gap to the filter installation mounting surface where a connector is provided for the external connection of the chip detector gap to an indicating or alarm system.

It should be noted that in place of the aforementioned permanent ceramic magnets ferrous and electromagnets may be used, respectively. Further, auxiliary functions such as that covered by the trade name "Zapper" can be incorporated, if required. Also various other supplemental accessories used in this art may be included in the subject configuration to attain an even more universally acting failure prevention device, so long as the believed to be unique feature of a single-structure chip detection and filter unit is maintained.

Moreover, the novel axial arrangement of the chip detector unit to the filter element results in a compact joint design allowing for the replacement of present filters with chip detector equipped filters occupying essentially the same total volume.

Further advantages of the subject improvement per se and over prior art will become more apparent from the following description and the accompanying drawing.

In the drawing, forming a part of this application:

FIG. 1 is an exploded view in front elevation and partly in cross-section of the subject filter and chip detector arrangement;

FIG. 2 is a top view of the magnetic chip detector assembly;

FIG. 3 is a cross-section in the plane III—III through a typical permanent-magnet type chip detector unit as installed at the oil flow entrance of the filter illustrated in the respective detail and installation fragments.

DETAILED DESCRIPTION

Referring now to the drawing, wherein like reference numerals designate like or corresponding parts and, more particularly, to FIG. 1, the joint chip detector-filter arrangement 10 consists of the, in this case, electrically grounded, partly cylindrical housing 12, the filter element 14, the, in this case, permanent-magnet type chip detector 16 and the coupling nut 18 securing the entire assembly. The housing 12 is equipped with an automatic bypass and/or a so-called pop button type by-pass indicator 22, provided at the lower extension 24 of the housing 12. An electric connector 26 is mounted at another location of the grounded housing bottom. A cylindrical stem 28 having a thread 30 formed at its top end and various offset shoulders and threads formed at its bottom end (not shown) is positioned axially within the cylindrical portion of the housing 12. Said cylindrical stem 28 may be electrically insulated from said grounded housing 12 through the application of bushings made from electrically insulating materials in a manner well known in this art and fastened together and to said housing 12 with traditional hardware (not shown). In this example, the electric connector has two terminal pins, one of which is connected to the grounded housing 12, the other to, say, said cylindrical stem 28. Obviously, other electric connection choices are available without affecting this description or the described functions.

The filter element 14 is positioned concentrically with said cylindrical stem 28, and lodged within the upwardly open, cylindrical cavity 32 of the housing 12. Preformed seals 34 are provided at mating filter terminations.

The filter element 14 consists of a cylindrical metal cage 36, serving as the structural frame, having passage holes 38 formed therein and an annular channel 40 formed radially at each of its two ends, within which a cylindrical filter screen 41 of any required type and fineness is positioned.

The chip detector 16, constituting the salient component of the assembly by virtue of its novel form and function, is composed of a cylindrical permanent magnet 42 (FIG. 3), of, in this case, the ferrous or the ceramic type, a washer 44 of an electrically nonconductive material positioned at each annular face of said magnet 42, another, substantially cylindrical member 46 of an electrically nonconductive material having a "T"-shaped cross section placed around the lateral outside of said permanent magnet 42, one annular, offset-shaped magnetic electrode 48 of a magnetically and electrically conductive material placed on each outside face of the aforementioned washer 44 so as to project the offset edges 50 of said magnetic electrodes 48 toward the outside of the so far described assembly of the chip detector 16, separated by the lateral surface 46A of the "T"-shaped part 46, providing an electrically and magnetically nonconductive debris gap spacer 46A and an annular member 54 of an electrically conductive material having an "L"-shaped cross-section is placed at the top of the chip detector parts, providing both electric debris shields and container means for the actual chip detector.

A bushing 56 (FIG. 1), of an electrically nonconductive material has a cross-section to accommodate the aforementioned chip detector parts.

A wavy washer 58 (FIG. 1), acting as a conductivity enhancer, is inserted between said annular member 54 and the nearest annular radial plane 60 (FIG. 3), of said bushing 56, thereby taking up all tolerance differentials.

An annular member 62 (FIG. 3) of any suitable metal and having a substantially "L"-shaped cross-section is arranged, partly, at the bottom of the chip detector assembly, partly along the lower lateral inside of said bushing 56 and spun about the latter to complete the chip detector assembly, under pressure of the now compressed wavy washer 58.

A hole 64 (FIG. 1), is formed in the bottom of the offset-shaped member 52 allowing for the chip detector installation on said stem 28, by means of the coupling nut 18, whereby said member 52 is abutting a preformed annular seal 66 (FIG. 3), and, conversely, the top of the annular channel 40 of the filter 14.

The entire assembly, described in the foregoing, is suitable for mounting on a vessel through its flanges 68, after the application of a downwardly open enclosure (not shown) mating with the "O"-ring 70, having the required inlet(s) and outlet(s) for the connection with a hydraulic system.

The internal electric signal or alarm circuit extends from one of the two terminal pins of the connector 26 to the grounded magnetic electrode 48A and debris shield 54 and past the electrically nonconductive debris gap spacer 46A from the ungrounded magnetic electrode 48 and debris shield 52 to the second terminal pin of the connector 26. The external signal circuit consists of a power source 72, arbitrarily of the d.c. kind, and, say, an indicating lamp 74 connected in series across those two terminal pins of the connector 26.

The significant operational phases of this filter and chip detector assembly are as follows:

The flow of, for example, lubricating oil occurs from the top of the chip detector 16, over its upper surface and past its periphery where the magnetic electrodes 48 and their faces 50 are exposed so as to arrest any ferrous particles floating in the passing oil stream and that before the stream enters the filter structure 14 for its processing of the fluid and eventual leaving the device for its own intended function.

When the quantity of ferrous chips collected is enough to bridge the exposed surface of the debris gap spacer 46A, the aforementioned electric circuit becomes closed and activates, for example, the indicating lamp 74, alerting personnel for the taking of remedial actions.

Depending on a considerable choice of circumstances, the filter 14 and the chip detector 16 may be used concurrently as suggested and described in this application, or individually within the basic structure of the housing 12. Comparable options are available concerning the inspection, servicing and replacement, respectively, of both the filter 14 and the chip detector 16 simultaneously or separately or of both together with the housing 12. It is also evident that the device shown and described herein in possible operational connection with lubricating fluids and systems, can readily be employed for numerous additional media, e.g. transmission and hydraulic fluids, and their dispositions.

Thus the invention includes an apparatus for the successive action of a chip detector and a filter in a liquid system in which a discrete chip detector is upstream with respect to a discrete filter unit and both are arranged within an enclosure. The chip detector has operationally active physical dimensions substantially identical with those of the filter. The apparatus includes a filter and chip detector assembly which attracts, retains, and indicates ferrous chips suspend in a liquid and for the successive filtering of the liquid. The assembly includes housing having means for mounting to a vessel and connection with a liquid system. The housing also has means for the installation of discrete operational units including a filter and a chip detector within its interior. An electric connector is included and means are provided for the wiring of one of the operational units with the connector. A discrete, cylindrical chip detector has a debris gap spacer mounted as the first element in the direction of the stream of the liquid through the housing. The debris gap spaces and the magnetic electrodes together can constitute the chip collection elements and are provided along the lateral surface of the cylindrical chip detector. Further the diameter of the cylindrical chip detector unit is at least as large as the diameter of the cylindrical filter element.

The chip detector can comprise an annular, permanent ferrous magnet having two pole faces and generating a magnetic field across the faces. At each face of the permanent ferrous magnet can be placed a magnetically and electrically nonconductive washer. A magnetic electrode can be incorporated so that its end face is placed at each pole face. The end face of each magnetic electrode can be spaced apart across a debris gap. Occupying the debris gas and separating the magnetic poles can be an annular electronically nonconductive member separator. One of the magnetic electrodes is connected e.g. by wiring, to the housing whereas the other magnetic electrode is connected, e.g. by wiring, to one of two connector terminals. A preferred embodiment is wherein a ceramic permanent magnet is in intimate contact with the magnetic electrodes.

The filtered and chip detector assembly can further include a discrete cylindrical filter mounted successively in the direction of the stream of the liquid through the housing. Also included is an electric alarm circuit adapted to become activated upon the collection of specific chip quantity across the debris gap spacer of the chip detector.

It is further understood that the herein shown and described embodiments, apparatus and units of the subject invention are but illustrative and that variations, modifications and alterations are feasible within the frame of these teachings.

What is claimed is:

1. A filter and chip detector assembly for the attraction, retention and indication of ferrous chips suspended in a liquid and for the successive filtering of said liquid comprising:
   (a) a housing having means for mounting to a vessel and connection with a liquid system, members for installation of discrete operational units in its interior, an electric connector and provisions for the wiring of at least one said discrete operational unit to said electric connector;
   (b) a discrete, cylindrical chip detector having a debris gap spacer mounted at a location within the housing whereby a stream of liquid entering said housing contacts first said spacer;
   (c) a discrete, cylindrical filter mounted at a location whereby it contacts the stream of liquid entering said housing after said stream of liquid contacts said chip detector;
   (d) an electric alarm circuit adapted to become activated upon the collection of a specific chip quantity across the debris gap spacer of said chip detector;
   (e) an annular, permanent ferrous magnet is provided having two pole faces and generating a magnetic field across them;
   (f) a magnetically and electrically nonconductive washer is placed at each face of said permanent, ferrous magnet;
   (g) a magnetic electrode having an end face placed at each pole face;
   (h) said end face of each said magnetic electrode spaced apart across a debris gap;
   (i) an annular electrically nonconductive member separating said magnetic electrodes and occupying said debris gap;
   (j) one said magnetic electrode wired to said housing; and
   (k) the other said magnetic electrode wired to one of two connector terminals.

2. A filter and chip detector assembly according to claim 1 wherein the diameter of said cylindrical chip detector unit is at least as large as the diameter of said discrete cylindrical filter.

3. A filter and chip detector assembly for the attraction, retention and indication of ferrous chips suspended in a liquid and for successive filtering of said liquid comprising:
   (a) a housing having means for mounting to a vessel and connection with a liquid system, members for installation of discrete operational units in its interior, an electric connector and provisions for the wiring of at least one said discrete operational unit to said electric connector;
   (b) a discrete, cylindrical chip detector having a debris gap spacer comprises magnetic electrodes mounted at a location along the lateral surface of said cylinderical chip detector, within the housing whereby a stream of liquid entering said housing contacts said first spacer;
   (c) a discrete, cylindrical filter mounted at a location whereby it contacts the stream of liquid entering said housing after said liquid contacts said chip detector;
   (d) an electric alarm circuit adapted to become activated upon the collection of a specific chip quantity across the debris gap spacer of said chip detector;
   (e) an annular ceramic permanent magnet is provided having two pole faces and generating a magnetic field across them;
   (f) a magnetically and electrically nonconductive washer is placed at each face of said ceramic permanent magnet;
   (g) a magnetic electrode having an end face placed at each pole face;
   (h) each end face of said magnetic electrode spaced apart across a debris gap;
   (i) an annular electrically nonconductive member separating said magnetic electrodes and occupying said debris gap;
   (j) one said magnetic electrode wired to said housing; and
   (k) the other said magnetic electrode wired to one of two connector terminals.

4. A filter and chip detector as in claim 3 wherein the diameter of the said cylindrical chip detector unit is at least as large as the diameter of said cylindrical filter.

* * * * *